United States Patent Office 3,677,724
Patented July 18, 1972

3,677,724
LIQUID HYDROCARBON COMPOSITIONS CONTAINING REACTION PRODUCTS OF AMINE DERIVATIVES OF 1-OLEFIN/MALEIC ANHYDRIDE COPOLYMERS AND METHYL VINYL ETHER-MALEIC ANHYDRIDE COPOLYMERS AS ANTI-STATIC AGENTS
Harry J. Andress, Jr., Pitman, N.J., assignor to Mobil Oil Corporation
No Drawing. Continuation-in-part of application Ser. No. 885,268, Dec. 15, 1969, which is a continuation-in-part of application Ser. No. 797,701, Feb. 7, 1969. This application Jan. 19, 1970, Ser. No. 4,024
Int. Cl. C10l 1/18, 1/22
U.S. Cl. 44—62
13 Claims

ABSTRACT OF THE DISCLOSURE

Liquid hydrocarbon compositions are provided containing, in an amount sufficient to impart anti-static properties, the reaction product of an amine derivative of an olefin/maleic anhydride copolymer and an alkyl vinyl ether-maleic anhydride copolymer.

CROSS REFERENCE TO RELATED APPLICATIONS

This application is a continuation-in-part of application Ser. No. 885,268 filed Dec. 15, 1969, which, in turn, is a continuation-in-part of application Ser. No. 797,701, filed Feb. 7, 1969, both now abandoned.

BACKGROUND OF THE INVENTION

Field of the invention

This invention relates to organic liquids having desirable anti-static properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges, with attendant danger of ignition or explosion, is significantly minimized, particularly in the handling, transportation or treatment of such liquids.

Description of the prior art

Prior to the present invention, the low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g. gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivty and thus reduce the aforementioned dangers of ignition and explosion. Such materials, however, have not been proved to be sufficiently effective in increasing the desired electrical conductivity of these fluids and, in many instances, have been found to be too costly for the relatively small degree of increased protection which they are capable of providing.

SUMMARY OF THE INVENTION

In accordance with the present invention, improved liquid hydrocarbon compositions are provided containing, in an amount sufficient to impart anti-static properties, the reaction product of an amine derivative of an olefin/maleic anhydride copolymer and an alkyl vinyl ether/maleic anhydride copolymer. The incorporation of these anti-static agents in the liquid composition, imparts increased electrical conductivity to an extent greater than that which has heretofore been realized with many other anti-static materials.

In general, the present invention, in its preferred applications, contemplates organic liquid compositions which normally are capable of accumulating a relatively large degree of electrostatic charge resulting in the aforementioned hazards of ignition and explosion, having incorporated therein a small amount of the aforementioned reaction product, usually from about 0.1 to about 200, and preferably from about 1 to about 10 pounds, per thousand barrels of the total volume of the liquid composition.

A field of specific applicability of the present invention is the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuels oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuels are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Speification D396–48T. Specifications for diesel fuels are defined in ASTM Specification D975–48T. Typical jet fuels are defined in Military Specification MIL–F–5624B.

Other fields of specific applicability of the present invention are: solvents, as used with paints; spot removers such as naphtha cleaners; textile compositions; pigments; liquid polishes; rubber compositions and the like. In brief, the anti-static agents of this invention can be used with a composition susceptible of accumulating a static electrical charge or a composition susceptible of generation of such a charge. Thus, a static electrical charge accumulated by such a composition can be reduced by coating a surface of the composition with one or more of the novel anti-static agents. For example, a fabric or fibre can be surface treated with one or more of the agents to reduce the susceptibility of the fabric or fibre to accumulate a static electrical charge.

The novel anti-static agents of the present invention comprise the reaction product of a maleamic acid of an olefin/maleic anhydride copolymer or an amine salt of the maleamic acid, and an alkyl vinyl ether/maleic anhydride copolymer.

Suitable maleamic acids and amine salts thereof are described in U.S. Pat. No. 3,003,858 and reference is made thereto for details regarding the acids and salts.

As stated in 3,003,858, suitable amines used to form the acids and salts are primary aliphatic amines having between about 4 and about 30 carbon atoms per molecule. Particularly preferred, and representative of the amines, are: primary amines having a tertiary carbon atom attached to an amino group and containing from about 12 to about 15 carbon atoms per amine molecule (often referred to in the literature as Primene 81R) or primary amines having a tertiary carbon atom attached to an amino group and containing from about 18 to about 24 carbon atoms per amine molecule (often referred to in the literature as Primene JMT); fatty amines, as exemplified by primary oleylamine, di-secondary cocoamine and tricaprylylamine; alkylaryl amines, as exemplified by phenylstearylamine; and complexed fatty acid fatty diamines, as exemplified by the condensation reaction product of 1 mol of oleyldiamine and 1 mol of a tall oil fatty acid and long chain aliphatic amines typified by octadecylamine.

Substituted amines such as glycine can also be employed, as can aromatic amine such as aniline.

The olefin/maleic anhydride copolymers are produced by copolymerizing equimolar amounts of an olefin and maleic acid anhydride. Preferred 1-olefin reactants contain between about 2 and about 18 carbon atoms per molecule. Branched chain 1-olefins are illustrated by diisobutylene. Internal olefins include and are illustrated by butene-2, pentene-2, and propylene tetramer. Polyolefins are illustrated by butadiene, pentadiene and 1,5-hexadiene.

The maleamic acids are formed by warming the olefin/maleic anhydride copolymer with an amine to form an amic acid. There is used one mole of amine per mole of maleic acid anhydride in the copolymers. Reaction occurs readily without the formation of water. Amine salts are formed by warming equimolar quantities of the amic acid with the same or different amine to form an amine salt.

A suitable alkyl vinyl ether/maleic anhydride copolymer is a methyl vinyl ether/maleic anhydride copolymer, which is a commercially available material. Copolymerization between the methyl vinyl ether and the maleic anhydride is conducted in a mol ratio of from 1:1. This copolymer is described in the literature as having the following structure:

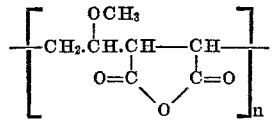

in which $n$ comprises a while number.

The literature further described the following physical properties for the aforementioned copolymer:

| | |
|---|---|
| Appearance | white, fluffy powder. |
| Softening point range (° C.) | 200–225. |
| Specific gravity of film | 1.37. |
| Bulk density of powder (lb./cu. ft.) | 20. |
| Angle of repose (degrees) | 39. |
| Residual free maleic anhydride | nil. |
| pH 5% aqueous solution (free acid) | approx. 2. |
| Unit molecular weight (anhydride) | 156. |
| Unit molecular weight (free acid) | 174. |
| Specific viscosity | 0.1–0.5. |

Another typical alkyl vinyl ether/maleic anhydride copolymer is one in which the alkyl group is hexadecyl as illustrated below in Example 12.

Insofar as the reaction between the maleamic acid or the amine salt of the maleamic acid and the copolymer are concerned, it is found that the reaction product can be produced by employing the maleamic acid or the amine salt of the maleamic acid and the methyl vinyl ether/maleic anhydride copolymer in a mol ratio of from about 1:0.01 to about 1:1, as more fully hereinafter described.

DESCRIPTION OF SPECIFIC EMBODIMENTS

The following examples will serve to illustrate the preparation of the novel anti-static agents of the present invention, and the effect thereof when these agents are present in organic liquid composition for the purpose of effectively imparting anti-static properties thereto, and particularly with respect to liquid hydrocarbon fuels.

Example 1

To a mixture of 98 grams (1 mol) of maleic anhydride, 252 grams (1 mol) of 1-octadecene, and 350 grams of xylene were added 7 grams of benzoyl peroxide. The resulting mixture was stirred at about 150° C. for about 4–5 hours in order to insure substantially complete copolymerization.

To 175 grams (0.25 mol) of the resulting 1-octadecene maleic anhydride copolymer containing 50% of xylene, there were added 100 grams (0.5 mol) of Primene 81R and 100 grams of xylene. The mixture which was formed was then stirred at 100° C. for about two hours in order to form the Primene 81R salt of the Primene 81R amic acid of the 1-octadecene-maleic anhydride copolymer.

To 400 grams (0.27 mol) of the Primene 81R salt containing 50% of xylene, formed above, were added 16 grams (0.1 mol) of a methyl vinyl ether/maleic anhydride copolymer (Gantrez AN–119). The resulting mixture was stirred at 140° C. for about two hours in order to form the desired reaction product, which is identified herein as Product 1.

Primene 81R is a mixture of primary amines having a tertiary carbon atom attached to the amino (—NH$_2$) group, containing from about 12 to about 15 carbon atoms per amine molecule.

Example 2

A mixture of 98 grams (1 mol) of maleic anhydride, 104 grams (1 mol) of styrene monomer, 5 grams benzoyl peroxide, and 202 grams xylene was stirred at 100° C. for 3 hours, to form a styrene/maleic anhydride copolymer. 400 grams (2 mols) of Primene 81R were added to the above styrene/maleic anhydride copolymer containing 50% xylene, and the resulting mixture was stirred at 100° C. for 3 hours. 40 grams (0.25 mol) of a methyl vinyl ether/maleic anhydride copolymer (Gantrez AN–119) were added and the mixture which formed was stirred at 140° C. for two hours to obtain the desired reaction product. This is identified as Product 2.

Example 3

A mixture of 98 grams (1 mol) of maleic anhydride, 140 grams (1 mol) of 1-decene, 7 grams of benzoyl peroxide, and 238 grams of xylene was stirred at 150° C. for four hours to form a maleic anhydride/1-decene copolymer. 600 grams (2 mols) of Primene JMT were added to the above 1-decene/maleic anhydride copolymer containing 50% xylene and the resulting mixture was stirred at 100° C. for 3 hours, 40 grams (0.25 mol) of a methyl vinyl ether/maleic anhydride copolymer (Gantrez AN–119) was added and the mixture which was formed was stirred at 140° C. for two hours to provide the desired reaction product, which is identified as Product 3.

Primene JMT is a mixture of primary amines having a tertiary carbon atom attached to the amino (—NH$_2$)

group containing from about 18 to about 24 carbon atoms per amine molecule.

Example 4

175 grams (0.5 mol) of 1-octadecene/maleic anhydride copolymer formed as described in Example 1, 270 grams (1.0 mol) of oleylamine, and 200 grams of xylene were stirred at 100° C. for three hours to form the dioleylamine salt of the 1-octadecene/maleic anhydride copolymer 260 grams (0.2 mol) of the salt containing about 30% of xylene and 16 grams (p.1 mol) of a methyl vinyl ether maleic anhydride copolymer (Gantrez AN-119) were stirred at 100° C. for about two hours to form the desired reaction product. This is identified as Product 4.

Example 5

A mixture of 42 grams (⅓ mol) of ethylene maleic anhydride copolymer formed by copolymerization of equimolar proportions of ethylene and maleic anhydride, 140 grams (⅔ mol) Primene 81R, and 364 grams xylene diluent was refluxed at 140° C. for about four hours. The mixture was cooled to 90° C. and 55 grams (⅓ mol) of Gantrez AN-119 (see Example 1) was added. The mixture was then refluxed for four hours at 140° C. to give the final product (Product 5).

Example 6

A mixture of 98 grams (1 mol) maleic anhydride, 168 grams (1 mol) propylene tetramer (a mixture of internal olefins), and 30 grams of ditertiary butyl peroxide was stirred at 150° C. for about 8 hours. The mixture was cooled to 80° C. and 200 grams (1 mol) Primene 81R was added. The mixture was then stirred at 125° C. for 2 hours, 78 grams (0.5 mol) Gantrez AN-119 and 1088 grams of xylene diluent were added and stirred for 4 hours at 115° C. to give the final product (Product 6).

Example 7

A mixture of 98 grams (1 mol) maleic anhydride, 112 grams (1 mol) diisobutylene (a branched chain 1-olefin) and 8 grams ditertiary butyl peroxide was stirred at 130° C. for about 6 hours. 200 grams (1 mol) Primene 81R was added and stirred for 6 hours at 125° C. 78 grams (0.5 mol) Gantrez AN-119 and 956 grams xylene diluent were added and stirred for 2 hours at 130° C. to give the final product (Product 7).

Example 8

A mixture of 65 grams (0.8 mol) 1,5 hexadiene, 160 grams (1.6 mol) maleic anhydride, and 30 grams of 30% hydrogen peroxide was stirred at 60° C. for about 6 hours. 300 grams (1.5 mol) Primene 81R was added and stirred for 3 hours at 125° C. 113 grams (0.75 mol) Gantrez AN-119 was added to the mixture and stirred for 3 hours at 150° C. to give the final product (Product 8).

Example 9

A mixture of 175 grams (0.5 mol) of the 1-octadecene maleic anhydride copolymer (see Example 1), 225 grams xylene, and 37.5 grams (0.5 mol) glycine was stirred at 136° C. for 3 hours. 39 grams (0.25 mol) Gantrez AN-119 was added and stirred an additional 3 hours at 136° C. to give the final product (Product 9).

Example 10

A mixture of 175 grams (0.5 mol) of the 1-octadecene maleic anhydride copolymer (see Example 1), 200 grams xylene, and 93 grams (1 mol) aniline was stirred for 2 hours at 100° C. 78 grams (0.5 mol) of Gantrez AN-119 was added and the mixture stirred at 130° C. for 6 hours to give the final product (Product 10).

Example 11

A mixture of 175 grams (0.5 mol) of the 1-octadecene maleic anhydride copolymer, 200 grams xylene and 269 grams (1 mol) octadecylamine was stirred at 105° C. for about 3 hours. 78 grams (0.5 mol) Gantrez AN-119 was added to the mixture and stirred at 110° C. for about 3 hours to give the final product (Product 11).

Example 12

A mixture of 190 grams (0.71 mol) hexadecyl vinyl ether, 70 grams (0.71 mol) maleic anhydride, 520 grams xylene, and 5 grams of ditertiary butyl peroxide was stirred for 4 hours at 145° C. to form a copolymer. 243 grams (0.71 mol) phenylstearylamine was added to the copolymer and the resulting mixture was stirred at 105° C. for 2 hours. 55 grams (0.35 mol) Gantrez AN-119 was added and the mixture stirred at 130° C. for 3 hours to give the final product (Product 12).

In accordance with the data of Table I following, a series of comparative electrical conductivity tests were carried out for the purpose of determining the aforementioned properties of the compositions prepared in accordance with Examples 1 through 4 with respect to imparting anti-static properties to organic liquid compositions. The test employed for this purpose was electrical conductivity measured in picomhos (i.e. $10^{-12}$ mhos) per meter. In these tests the aforementioned anti-static agents were blended in a liquid hydrocarbon fuel composition comprising about 75% catalytically cracked component and about 25% straight-run component, boiling at a temperature from about 320–720° F. The resulting fuel compositions were then evaluated for their degree of improvement in electrical conductivity, with the results shown in the table.

TABLE I

| Composition | Plus anti-static agent— | Concentration, lbs./1,000 bbls. | Conductivity, picomhos/meter |
|---|---|---|---|
| Uninhibited fuel oil | | 0 | 10 |
| Do | Product 1 | 5 | 514 |
| Do | do | 10 | 861 |
| Do | Product 2 | 0 | 12 |
| Do | Product 2 | 10 | 550 |
| Do | Product 3 | 10 | 787 |
| Do | Product 4 | 10 | 879 |

TABLE II

[Same fuel as in Table I]

| Compound | Concentration, lbs./1,000 bbls. | Conductivity, picomhos/meter |
|---|---|---|
| Uninhibited fuel oil | 0 | 10 |
| Uninhibited fuel oil plus Example 5 | 5 | 1,110 |
| Uninhibited fuel oil plus Example 6 | 5 | 399 |
| Uninhibited fuel oil plus Example 7 | 5 | 437 |
| Uninhibited fuel oil plus Example 8 | 5 | 221 |
| Uninhibited fuel oil plus Example 9 | 5 | 290 |
| Uninhibited fuel oil plus Example 10 | 5 | 108 |
| Uninhibited fuel oil plus Example 11 | 5 | 450 |
| Uninhibited fuel oil plus Example 12 | 5 | 424 |

As will be seen from the data of the examples of Table I, a marked improvement in anti-static propertties of organic liquid compositions is obtained through the use of the anti-static additives of the present invention.

As indicated above, the anti-static agents also function as inhibitors against objectionable emulsification. The emulsion test employed involves the following procedure.

A 200 milliliter portion of the fuel to be tested and 20 milliliters of distilled water are placed in a clear glass pint bottle. The bottle is tightly capped and set in an Everbach mechanical shaker in a horizontal position such that the maximum degree of agitation is afforded. The shaker is run at its maximum setting for 5 minutes. The bottle is then removed and allowed to stand in an upright position in the dark for 24 hours. At the end of the 24 hours settling period, the appearance of the water layer is noted. The fuel layer is siphoned off, care being taken not to disturb the oil-water interface, and is discarded. A fresh portion of the fuel oil being tested then added. The described sequence of steps is repeated. If no emulsion appears in the water layer after this sequence has been performed ten times, the oil is considered to have passed the test. On the other hand, if, after any 24 hour settling period in the procedure, there is any degree of emulsification in the water layer, the fuel is considered to have failed the test. This test procedure has been found to provide emulsions in inhibited oils similar to emulsions which occur in these same oils only after prolonged periods of normal handling and storage in the field on a commercial basis.

The fuel oil employed in the emulsion test is the same as described above in connection with the anti-static test. Results obtained in the emulsion tests are shown in Table III following.

TABLE III

| Composition | Product | Concentration, lbs./1,000 bbls. | Emulsion rating |
|---|---|---|---|
| Uninhibited fuel oil | | 0 | Pass. |
| Do | Product 1 | 8 | Do. |
| Do | Primene 81 R salt formed in Example 1 | 8 | Fail. |

As shown by the data set forth in Tables I and III, the new reaction products are highly effective, non-emulsive, ashless antistatic agents for fuels.

As indicated above, the new reaction products are also useful in a variety of environments. Test results are given below for Product 1 in a typical ink oil (a sulfuric acid treated kerosene), a typical solvent used as a paint thinner, and a typical textile lubricant (a low viscosity white oil). The vehicles used have the following properties:

Ink oil

| | |
|---|---|
| Specific gravity, 60° F. | 0.805 |
| Aniline point, ° F. | 180 |
| Kauri butanol No. | >10 |
| ASTM distillation, ° F.: | |
| Initial boiling point | 350 |
| 50% point | 440 |
| End point | 550 |

Solvent

| | |
|---|---|
| Specific gravity, 60° F. | 0.7839 |
| Flash point, tag open cup, ° F. | 106 |
| Aniline point, ° F. | 136 |
| Kauri butanol No. | 37 |
| ASTM distillation, ° F.: | |
| Initial boiling point | 312 |
| 50% point | 343 |
| Dry point | 393 |

Textile lubricant

| | |
|---|---|
| Specific gravity, 60° F. | 0.860–0.870 |
| Pour point, ° F. | 20 |
| Saybolt viscosity @100° F., secs. | 125–135 |
| Kinematic viscosity @37.8° C., cs. | 26.5–29.0 |

The electrical conductivity tests results for Product 1 in the ink oil, solvent and textile lubricant, and said materials free of Product 1, are provided in Table IV.

TABLE IV

| Composition | Anti-static agent | Concentration, percent by weight | Conductivity, picomhos/meter |
|---|---|---|---|
| Base ink oil | | 0 | 0.13 |
| Do | Product 1 | 0.01 | 424 |
| Base solvent | | 0 | 4.4 |
| Do | Product 1 | 0.01 | 1,440 |
| Base textile lubricant | | 0 | <0.1 |
| Do | Product 1 | 0.1 | 496 |

The textile lubricant can also be used with air filters, electrical equipment, as a baking pan oil, and in such industries as food processing, canning, egg processing, cosmetics.

It will be understood, of course, that the improved organic liquid compositions of the present invention may, if so desired, contain various other additives or mixtures of such additional additives in order to further enhance their properties. Thus, the organic liquid compositions of the present invention may also contain such additives as antioxidants, detergents, dispersants, stability improvers and the like. It will also be understood that although the present invention has been described with preferred embodiments, various modifications and adaptations thereof may be resorted to without departing from the spirit and scope of the invention, as those skilled in the art will readily understand.

I claim:

1. A composition comprising a liquid hydrocarbon boiling in the distillate fuel range selected from the group consisting of gasoline, solvent and fuel oil, and susceptible of accumulating a static electrical charge containing in an amount sufficient to reduce such charge, the reaction product of:

(1) a maleamic acid of a heteropolymer of maleic acid anhydride and a monoolefin having at least two carbon atoms per molecule and an unsubstituted primary amine containing between about 4 and about 30 carbon atoms per molecule, glycine or aniline and an alkyl vinyl ether/maleic anhydride copolymer, or (2) the reaction product of an amine salt of the maleamic acid of (1) and an alkyl vinyl ether/maleic anhydride copolymer, the heteropolymer having been prepared by copolymerizing equimolar amounts of the olefin and maleic acid anhydride; the maleamic acid having been prepared by the reaction of one mole of amine per mole of maleic acid anhydride in the olefin/maleic anhydride heteropolymer; the amine salt having been prepared by reacting equimolar amounts of the maleamic acid and the amine; the reaction between the maleamic acid and the alkyl vinyl ether/maleic anhydride copolymer or the reaction between the amine salt of maleamic acid and the alkyl vinyl ether/maleic anhydride copolymer, being carried out in a mole ratio of 1:0.01 to about 1:1; and copolymerization between the alkyl vinyl ether and the maleic acid anhydride being carried out in a mole ratio of 1:1.

2. The composition of claim 1 wherein the reaction product is formed of the amine salt (2).

3. The composition of claim 1 wherein said reaction product is present in an amount from about 0.1 to about 200 pounds per thousand barrels of said composition.

4. The composition of claim 1 wherein said reaction product is present in an amount from about 1 to about 10 pounds per thousand barrels of said composition.

5. The composition of claim 1 wherein said amine comprises a primary amine having a tertiary carbon atom attached to an amino group and containing from about 12 to about 15 carbon atoms per amine molecule.

6. The composition of claim 1 wherein said amine comprises a primary amine having a tertiary carbon atom attached to an amino group and containing from about 18 to about 24 carbon atoms per amine molecule.

7. The composition of claim 1 wherein said amine comprises a fatty amine.

8. The composition of claim 7 wherein said amine comprises primary oleylamine.

9. The composition of claim 1 wherein the 1-olefin is 1-octadecene.

10. The composition of claim 1 wherein the 1-olefin is 1-decene.

11. The composition of claim 1 wherein the 1-olefin is styrene.

12. The composition of claim 1 wherein said liquid hydrocarbon comprises a jet fuel.

13. The composition of claim 1 wherein said liquid hydrocarbon comprises a turbine fuel.

References Cited

UNITED STATES PATENTS 3,003,858  10/1961  Andress et al. .......... 44—62
3,256,073  6/1966   Hess .................. 44—62 X DANIEL E. WYMAN, Primary Examiner
W. J. SHINE, Assistant Examiner U.S. Cl. X.R.

44—63

PO-1050
(5/69)

UNITED STATES PATENT OFFICE
CERTIFICATE OF CORRECTION

Patent No. 3,677,724         Dated  July 18, 1972

Inventor(s)    HARRY J. ANDRESS, JR.

It is certified that error appears in the above-identified patent and that said Letters Patent are hereby corrected as shown below:

Column 2, line 57 "Speification" should read --Specification--

Column 3, line 38 "1,5" should read --1.5--

Column 3, line 58 "while" should read --whole--

Column 4, line 69, after "hours" the comma should be replaced by a period

Column 8, line 66 "7" should read "1"

Signed and sealed this 2nd day of January 1973.

(SEAL)
Attest:

EDWARD M. FLETCHER, JR.
Attesting Officer

ROBERT GOTTSCHALK
Commissioner of Patents